3,234,205
METAL COMPLEX COMPOUNDS OF
MONOAZO-DYESTUFFS
Rudolf Kühne and Fritz Meininger, Frankfurt am Main,
Germany, assignors to Farbwerke Hoechst Aktiengesellschaft vormals Meister Lucius & Brüning, Frankfurt am Main, Germany, a corporation of Germany
No Drawing. Filed Feb. 5, 1963, Ser. No. 256,261
Claims priority, application Germany, Feb. 8, 1962,
F 35,973
6 Claims. (Cl. 260—151)

The present invention relates to metal complex compounds of monoazo-dyestuffs containing N-alkylated ethionylamino, β-chloro-ethane-sulfonylamino or vinylsulfonylamino groups and to a process for their manufacture.

It has been found that copper, cobalt, nickel and chromium complex compounds of monoazo-dyestuffs containing N-alkylated ethionylamino, β-chloro-ethane-sulfonylamino or vinylsulfonylamino groups which, in the free acid form, having one of the following general formulae

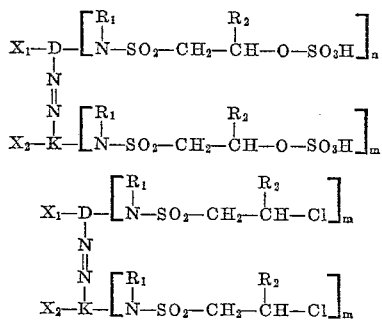

and

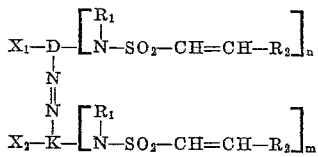

wherein D represents a mono- or binuclear aryl radical, for example a radical of the benzene or naphthalene series, which may be substituted, in particular, by sulfonic acid groups, K represents the radical of a coupling component, for instance of the benzene, naphthalene and pyrazolone series, $R_1$ represents a lower alkyl or aralkyl group, $R_2$ represents a hydrogen atom or a lower alkyl group, $X_1$ represents a hydroxy or carboxylic acid group bound in o-position to the azo group, $X_2$ represents a hydroxy or amino group bound in o'-position to the azo group, and $n$ and $m$ stand for 0, 1 or 2, the sum $n+m$ being 1 or 2, can be prepared by reacting the copper, cobalt, nickel or chromium complex compounds of monoazo-dyestuffs having one of the following general formulae

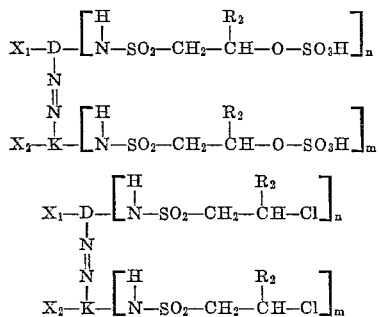

and

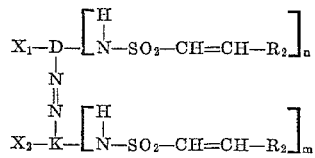

wherein D, K, $R_2$, $X_1$, $X_2$, $n$ and $m$ are as defined above, with alkylating agents in an aqueous medium in the presence of an acid-binding agent.

The metal complex azo-dyestuffs which may be used as starting materials in the process of the present invention can be prepared in known manner by reacting azo-dyestuffs containing one or more groups capable of forming a metal complex, preferably at least one group inparting solubility in water, and an ethionylamino, β-chloro-ethane-sulfonylamino or vinylsulfonylamino group, with metal donors.

When carrying out the process of the present invention, the dyestuffs used as starting material are dissolved in water or, in case they are sparingly soluble or insoluble in water, suspended therein in a finely divided form, and reacted at a temperature of between about 30° C. and 130° C. in the presence of an acid-binding agent in the neutral or weakly alkaline range with an alkylating agent, while vigorously stirring. The pH-value to be used ranges from about 7 to 9.

As alkylating agents there may be used alkyl halides, such as methyl and ethyl bromide, or aralkyl halides, such as benzyl chloride, or dialkyl sulfates, such as dimethyl sulfate or diethyl sulfate.

As acid-binding agents there may be used alkali metal or alkaline earth metal hydroxides, borates, phosphates or acetates, especially alkali metal or alkaline earth metal carbonates or hydrogen carbonates, such as potassium hydrogen carbonate, sodium carbonate or calcium carbonate.

The metal complex azo-dyestuffs containing N-alkyl-vinylsulfonylamino groups can also be prepared directly from dyestuffs which contain N-ethionylamino or β-chloro-ethane-sulfonylamino groups. The preparation of dyestuffs containing N-alkyl-vinylsulfonylamino groups may be carried out, for example, by reacting the dyestuffs used as starting material (which contain N-ethionylamino or β-chloro-ethane-sulfonylamino groups) at a pH-value of between about 8.5 and 10 with dialkyl sulfate. If desired, dyestuffs containing N-alkyl-ethionylamino or N-alkyl-β-chloro-ethane-sulfonylamino groups prepared according to the process of the present invention may be transformed into the products of the present process containing N-alkyl-vinylsulfonylamino groups by a subsequent treatment with an acid-binding agent.

The metal complex dyestuffs used in the process of the present invention as starting compounds and the final products obtainable by the process of the present invention are, in the case of the copper and nickel complex dyestuffs, so-called 1:1-complex compounds and, in the case of the cobalt and chromium dyestuffs, so-called 2:1 complex compounds.

The water-soluble metal complex azo-dyestuffs obtainable by the process of the present invention are suitable for dyeing and printing natural or regenerated protein fibers, such as wool and silk, furthermore, polyamide and polyurethane fibers, and especially native and regenerated cellulose material, such as cotton, linen, staple fiber or artificial silk. The dyeing and printing of cellulose fibers is carried out advantageously by treating the material with an aqueous solution of the dyestuff at normal or elevated temperatures in the presence of an acid-binding agent or by printing with a printing paste in the presence of an acid-binding agent and by subsequently heating and steaming the material.

The metal complex azo-dyestuffs obtainable by the process of the present invention possess practical advantages over the dyestuffs used as starting material. When dyeing cotton according to the direct dyeing method or the so-called pad-batch process, or when printing cotton, better results, especially a higher proportion of dyestuff fixed on the fibrous material, are obtained, with the products obtained in the process of the present invention as compared with the dyestuffs used herein as starting materials. As a rule, the dyestuffs yield pure dyeings and prints distinguished by good fastness properties, more particularly, by a good to very good fastness to light and a very good fastness to wet processing.

The following examples serve to illustrate the invention, but they are not intended to limit it. The parts and percentages are by weight unless otherwise stated and the relationship of parts by weight to parts by volume is the same as that of the kilogram to the liter.

*Example 1*

10 parts of the copper complex azo-dyestuff obtainable by diazotizing 1-aminobenzene-3-sulfonic acid, coupling the diazo compound obtained with 1-hydroxy-6-ethionylaminonaphthalene-3-sulfonic acid and by subsequent oxidizing coppering are dissolved in the form of the potassium salt in 200 parts by volume of water. 30 parts by volume of dimethyl sulfate and dilute sodium hydroxide solution or potassium hydroxide solution are slowly introduced at 45° C. to 50° C. into the vigorously stirred dyestuff solution. The speed with which the mixture is introduced is adjusted so as to maintain a pH-value of between 7.2 and 7.5. The mixture is after-stirred for 3 hours at 45° C. to 50° C., and subsequently potassium chloride is added. The product precipitated is separated by filtration at 20° C., washed with potassium chloride solution and dried in vacuo at 50° C. There is obtained a dark powder which dissolves easily in water to give a claret solution.

4 parts of the dyestuff obtained are mixed with 5 parts of urea, the mixture is dissolved in 41 parts of water and introduced into 50 parts of a sodium-alginate-thickener of 4% strength, while stirring. 3 parts of sodium bicarbonate are then added, and a cotton fabric is printed with the paste obtained. The fabric is dried and steamed for 5 minutes at 100° C. to 102° C. The material is then rinsed, soaped at boiling temperature, rinsed again and dried. There is obtained an intense, claret print possessing a good fastness to boiling.

If 4 parts of the dyestuff used as a starting material herein are used for printing, instead of the same quantity of the methylated dyestuff, dull prints of only very low intensity are obtained.

*Example 2*

30 parts of the metal complex azo-dyestuff obtained by coupling diazotized 2-amino-1-hydroxy-4-ethionylaminobenzene with 1-hydroxy-8-acetylaminonaphthalene-3,6-sulfonic acid and by subsequent oxidizing coppering are dissolved at 40° C. in 310 parts by volume of water. For methylating, 50 parts by volume of dimethyl sulfate and saturated potassium bicarbonate or sodium carbonate solution are introduced simultaneously within 1 hour at said temperature, while vigorously stirring, so as to maintain a pH-value of between 7.0 and 7.4. The mixture is after-stirred for 1 hour at 40° C. The product is salted out at 0° C. with potassium chloride, separated by filtration and dried in vacuo at 60° C. The dyestuff containing an N-methyl-N-ethionylamino group in the molecule is obtained in the form of a black violet powder which dissolves easily in water to give a violet solution. According to the printing directions for cotton given in Example 1, the product yields—contrary to the dyestuff used as starting material—an intense, clear violet tint.

*Example 3*

12 parts of the metal complex azo-dyestuff prepared by coupling diazotized 4-amino-1-N-vinylsulfonylaminobenzene with 7-acetylamino-1-hydroxynaphthalene-3-sulfonic acid and by subsequent oxidizing coppering are dissolved with heating in 230 parts by volume of water. Diethyl sulfate and concentrated sodium bicarbonate solution are added slowly at a temperature of between 60° C. and 70° C. and a pH-value of between 7.5 and 8, while vigorously stirring, until the dyestuff used as starting material is completely ethylated. When the reaction is complete, the mixture is cooled down to 10° C., and potassium chloride is added. The dyestuff precipitated is isolated by filtration. The product obtained yields—according to the pad-steam process, in which tertiary sodium phosphate and sodium hydroxide solution are used as acid-binding agents—an intense, claret print possessing a good fastness to washing.

*Example 4*

15 parts of the metal complex azo-dyestuff prepared by coupling diazotized 4-amino-1-N-ethionylaminobenzene with 1-hydroxynaphthalene-3,6-disulfonic acid and by subsequent oxidizing coppering are dissolved at 90° C. in 195 parts by volume of water. 30 parts by volume of benzyl chloride and 2 N-sodium hydroxide solution are introduced at a temperature of between 90° C. and 95° C. and at a pH-value of 8 within 1 hour, while vigorously stirring. The mixture is after-stirred for 1½ hours at the same temperature and at the same pH-value. When the temperature is complete, the mixture is neutralized with dilute acetic acid, distilled with steam and subsequently cooled down to room temperature. The benzylated product is salted out with potassium chloride, separated by filtration and dried at 60° C. According to the printing directions given in Example 1, the dyestuff yields an intense, claret cotton print.

The following table contains further dyestuffs used as starting material which can be transformed according to the process of the present invention with the corresponding alkylating agents indicated in the table into the novel dyestuffs which are correspondingly alkyl-substituted at the nitrogen atom of the ethionylamino group. The last column contains the tints obtained with the alkylated starting dyestuffs on dyeing or printing cellulosic fabrics in the presence of an acid-binding agent.

| No. | Dyestuff used as starting material | Alkylating agent; Acid-binding agent | Tint on cotton |
|---|---|---|---|
| 1 | 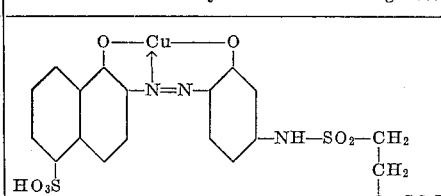 | Dimethyl sulfate; sodium carbonate | Claret. |

| No. | Dyestuff used as starting material | Alkylating agent; Acid-binding agent | Tint on cotton |
|---|---|---|---|
| 2 | [Cu complex azo dye with HO₃S, HO₃S- groups and -NH-SO₂-CH=CH₂] | Dimethyl sulfate; sodium bicarbonate | Ruby. |
| 3 | [Cu complex azo dye with HO₃S, HO₃S-, Cl and -NH-SO₂-CH₂-CH₂-O-SO₃H] | Diethyl sulfate; sodium carbonate | Red violet. |
| 4 | [2:1-chromium complex azo dye with O=C-OH, OH, HO₃S and -NH-SO₂-CH₂-CH₂-O-SO₃H] | Dimethyl sulfate; sodium bicarbonate | Red brown. |
| 5 | [Cu complex azo dye with HO₃S, -NH-CO-CH₃, NH-SO₂-CH₂-CH₂-O-SO₃H] | ----do---- | Claret. |
| 6 | [2:1-cobalt complex azo dye with OH, H₂N, HO₃S, NH-SO₂-CH₂-CH₂-O-SO₃H] | Dimethyl sulfate; sodium carbonate | Grey. |
| 7 | [Cu complex azo dye with NH, -NH₂, SO₃H, NH-SO₂-CH₂-CH₂-O-SO₃H] | ----do---- | Brown. |
| 8 | [Cu complex azo dye with NH-CO-CH₃, HO₃S, SO₃H, NH-SO₂-CH₂-CH₂-O-SO₃H] | ----do---- | Red violet. |

| No. | Dyestuff used as starting material | Alkylating agent; Acid-binding agent | Tint on cotton |
|---|---|---|---|
| 9 | [structure: azo dye with OH, HO, NH—CO—CH$_3$, HO$_3$S, SO$_3$H, NH—SO$_2$—CH$_2$—CH$_2$—O—SO$_3$H groups; 2:1-chromium complex] | Dimethyl sulfate; sodium carbonate | Blue grey. |
| 10 | [structure: Ni complex azo dye with Cl, CH$_3$, SO$_3$H, NH—SO$_2$—CH$_2$—CH$_2$—O—SO$_3$H groups] | Dimethyl sulfate; sodium acetate | Yellow. |
| 11 | [structure: HO$_3$S-naphthyl—N=N—C=C—NH—phenyl—NH—SO$_2$—CH$_2$—CH$_2$—O—SO$_3$H with OH, HO, CO—CH$_3$; 2:1—chromium complex] | Diethyl sulfate; sodium carbonate | Red. |
| 12 | [structure: Cu complex azo dye with HO$_3$S, NH—SO$_2$—CH$_2$—CH$_2$—O—SO$_3$H, NH—SO$_2$—CH$_2$—CH$_2$—O—SO$_3$H groups] | do | Claret. |
| 13 | [structure: Cu complex azo dye with HO$_3$S, NH—CO—CH$_3$, CH$_2$—NH—SO$_2$—CH$_2$—CH$_2$—O—SO$_3$H groups] | Dimethyl sulfate; potassium bicarbonate. | Do. |
| 14 | [structure: Cu complex azo dye with NH—CO—CH$_3$, HO$_3$S, SO$_3$H, HN—SO$_2$—CH$_2$—CH$_2$—O—SO$_3$H groups] | do | Red violet. |
| 15 | [structure: Cu complex azo dye with HO$_3$S, HO$_3$S, SO$_3$H, SO$_3$H, HN—SO$_2$—HC=CH$_2$ groups] | do | Reddish blue. |
| 16 | [structure: Cu complex azo dye with NH—CO—CH$_3$, HO$_3$S, SO$_3$H, NH—SO$_2$—CH$_2$—CH$_2$—Cl groups] | do | Red violet. |

| No. | Dyestuff used as starting material | Alkylating agent; Acid-binding agent | Tint on cotton |
|---|---|---|---|
| 17 | | Dimethyl sulfate; potassium bicarbonate. | Claret. |
| 18 | | Dimethyl sulfate; sodium bicarbonate. | Violet. |
| 19 | | Dimethyl sulfate; potassium bicarbonate. | Claret. |
| 20 | | Dimethyl sulfate; sodium carbonate. | Do. |
| 21 | | Dimethyl sulfate; potassium bicarbonate. | Violet. |

We claim:

1. Complex metal compounds of monoazodyestuffs, said compounds containing a metal selected from the group consisting of copper, cobalt, nickel, and chromium, said monoazodyestuffs having, in their free acid form, a formula selected from the group consisting of

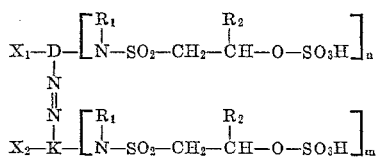

and

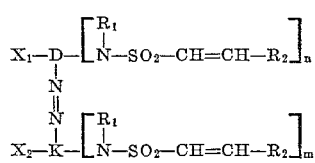

where D represents a radical of the benzene and naphthalene series, K represents the radical of a coupling component of the group consisting of radicals of the benzene, naphthalene and pyrazolene series, $R_1$ represents a member of the group consisting of lower alkyl and benzyl, $R_2$ represents a member of the group consisting of hydrogen and lower alkyl, $X_1$ represents a member of the group consisting of hydroxy and carboxyl bound in o-position to the azo group, $X_2$ represents a member of the group consisting of hydroxy and amino bound in o'-position to the azo group, and $n$ and $m$ stand for an integer from 0 to 2, the sum $n+m$ being an integer from 1 to 2.

2 The 1:1-copper complex compound of the monoazodyestuff having the formula

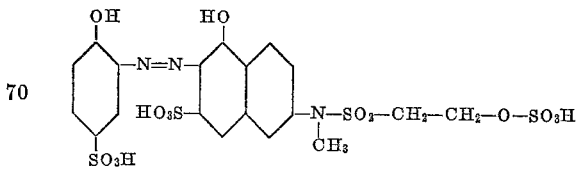

3. The 1:1-copper complex compound of the monoazo-dyestuff having the formula

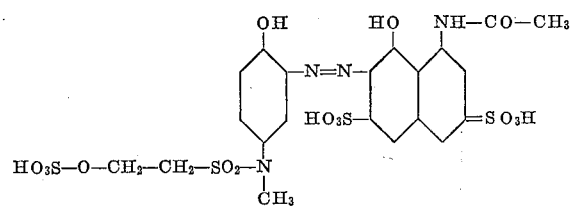

4. The 2:1-chromium complex compound of the monoazo-dyestuff having the formula

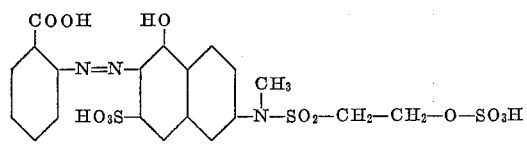

5. The 1:1-copper complex compound of the monoazo-dyestuff having the formula

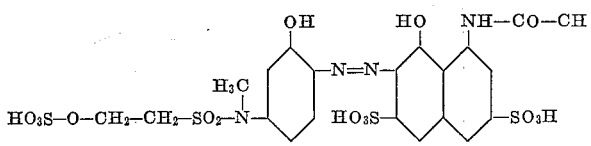

6. The 1:1-copper complex compound of the monoazo-dyestuff having the formula

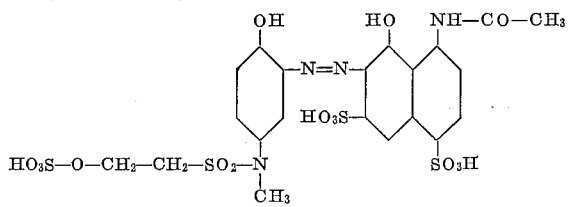

References Cited by the Examiner

UNITED STATES PATENTS

| | | | |
|---|---|---|---|
| 2,802,817 | 8/1957 | Dittmar et al. | 260—151 |
| 2,991,280 | 7/1961 | Schetty et al. | 260—151 |
| 3,007,762 | 11/1961 | Wegmann et al. | 260—151 X |
| 3,040,022 | 6/1962 | Starn | 260—153 |
| 3,057,845 | 10/1962 | Liechti et al. | 260—151 X |

FOREIGN PATENTS

| | | |
|---|---|---|
| 214,547 | 4/1961 | Austria. |
| 1,112,799 | 8/1961 | Germany. |
| 885,814 | 12/1961 | Great Britain. |

OTHER REFERENCES

Migrdichian: Organic Synthesis, vol. II, pp. 1431-2.

CHARLES B. PARKER, *Primary Examiner.*